United States Patent
Zur et al.

(10) Patent No.: US 10,409,970 B2
(45) Date of Patent: Sep. 10, 2019

(54) SYSTEM AND METHOD FOR RESOLVING USER IDENTIFICATION

(71) Applicant: NICE LTD., Ra'anana (IL)

(72) Inventors: Tal Zur, Rishon-Lezion (IL); Roie Mandler, Kfar-Saba (IL); Oren Weiss, Kfar Saba (IL)

(73) Assignee: Nice Ltd., Ra'anana (IL)

( * ) Notice: Subject to any disclaimer, the term of this patent is extended or adjusted under 35 U.S.C. 154(b) by 141 days.

(21) Appl. No.: 15/049,464

(22) Filed: Feb. 22, 2016

(65) Prior Publication Data

US 2017/0242991 A1 Aug. 24, 2017

(51) Int. Cl.
*H04L 29/06* (2006.01)
*G06F 21/32* (2013.01)
*G06F 21/31* (2013.01)

(52) U.S. Cl.
CPC ............ *G06F 21/32* (2013.01); *G06F 21/316* (2013.01)

(58) Field of Classification Search
USPC .......................................................... 726/18
See application file for complete search history.

(56) References Cited

U.S. PATENT DOCUMENTS

| | | | |
|---|---|---|---|
| 5,903,269 A | 5/1999 | Poreh et al. | |
| 6,040,832 A | 3/2000 | Poreh et al. | |
| 6,222,542 B1 | 4/2001 | Poreh et al. | |
| 6,542,602 B1 * | 4/2003 | Elazar | H04M 3/5183 |
| | | | 379/265.06 |
| 7,873,156 B1 * | 1/2011 | Blair | H04M 3/5175 |
| | | | 379/265.01 |
| 8,150,021 B2 | 4/2012 | Geva et al. | |
| 8,194,848 B2 | 6/2012 | Zernik et al. | |
| 8,526,597 B2 | 9/2013 | Geva et al. | |
| 8,811,590 B2 | 8/2014 | Zernik et al. | |
| 8,976,955 B2 | 3/2015 | Liberman et al. | |
| 9,015,677 B2 | 4/2015 | Tunik et al. | |
| 9,098,361 B1 | 8/2015 | Greenberg et al. | |
| 1,137,093 A1 | 10/2015 | Geffen et al. | |
| 9,479,727 B1 * | 10/2016 | Kolodizner | H04L 12/1831 |
| 9,721,571 B2 * | 8/2017 | Lousky | G10L 17/04 |
| 2004/0100507 A1 * | 5/2004 | Hayner | G06F 9/451 |
| | | | 715/855 |
| 2006/0089837 A1 * | 4/2006 | Adar | H04M 3/2227 |
| | | | 705/309 |
| 2006/0277043 A1 * | 12/2006 | Tomes | G10L 17/04 |
| | | | 704/247 |
| 2008/0155493 A1 | 6/2008 | Zernik | |
| 2010/0017263 A1 | 1/2010 | Zernik et al. | |
| 2010/0138775 A1 * | 6/2010 | Kohen | G06F 9/543 |
| | | | 715/781 |
| 2010/0257443 A1 | 10/2010 | Zernik et al. | |
| 2011/0225628 A1 * | 9/2011 | Hirose | G06F 17/243 |
| | | | 726/3 |
| 2011/0289220 A1 * | 11/2011 | Henson | H04M 3/5116 |
| | | | 709/227 |

(Continued)

*Primary Examiner* — Harris C Wang
(74) *Attorney, Agent, or Firm* — Pearl Cohen Zedek Latzer Baratz LLP

(57) ABSTRACT

A system and method obtain a recording of an interaction with a user and a screen recording related to the interaction; extract, from the screen recording, a unique identification value related to the user; resolve the identity of the user using the extracted unique identification value; and associate the user with the recorded interaction by associating the unique identification value with the interaction.

25 Claims, 6 Drawing Sheets

(56) References Cited

U.S. PATENT DOCUMENTS

| | | | |
|---|---|---|---|
| 2012/0084254 A1* | 4/2012 | Richards | G06F 9/541 707/609 |
| 2012/0162246 A1* | 6/2012 | Kinarti | G06K 9/2081 345/619 |
| 2013/0110588 A1 | 5/2013 | Livne et al. | |
| 2013/0173351 A1 | 7/2013 | Livne et al. | |
| 2013/0218947 A1* | 8/2013 | Zur | G06Q 10/06 709/203 |
| 2014/0250227 A1* | 9/2014 | Slovacek | H04L 43/10 709/224 |
| 2014/0280431 A1 | 9/2014 | Shelest | |
| 2014/0282660 A1* | 9/2014 | Oztaskent | H04N 21/4828 725/18 |
| 2014/0297268 A1* | 10/2014 | Govrin | G06Q 40/02 704/9 |
| 2014/0330563 A1 | 11/2014 | Faians et al. | |
| 2014/0335480 A1* | 11/2014 | Asenjo | G09B 19/18 434/107 |
| 2015/0235159 A1 | 8/2015 | Geffen et al. | |
| 2015/0378561 A1* | 12/2015 | Ollinger | G06Q 30/016 707/769 |
| 2015/0378577 A1* | 12/2015 | Lum | G06Q 10/10 715/720 |
| 2016/0189176 A1 | 6/2016 | Newnham et al. | |
| 2016/0239805 A1 | 8/2016 | Geffen et al. | |
| 2016/0292706 A1 | 10/2016 | Newnham | |
| 2016/0365095 A1 | 12/2016 | Lousky et al. | |
| 2017/0132052 A1 | 5/2017 | Abramovici et al. | |

\* cited by examiner

SYSTEM AND METHOD FOR RESOLVING USER IDENTIFICATION

FIELD OF THE INVENTION

The present invention relates generally to resolving user identification (ID). More specifically, the present invention relates to using a screen recording related to an interaction in order to associate a user with a recording of the interaction.

BACKGROUND OF THE INVENTION

Organizations, businesses and systems (e.g., customer services and contact centers) that record interactions with customers or other entities typically need to maintain a clear correlation between their recorded interactions and the customers, users or end-users who were recorded. Recorded interaction may be of any type, e.g., voice, video or chat. In addition, a list or an association of recorded interactions of a user or customer is highly desired by businesses and systems that record interactions with customers.

Today, many businesses and systems that record interactions with customers have a large amount of legacy data that includes recorded interactions that are not associated with customers, users or end-users. For example, it may be that when a recording of an interaction was made the recoding was not associated with a customer and therefore, a database may include or store a recording that cannot be linked, associated or connected with a specific customer or user.

SUMMARY OF THE INVENTION

In some embodiments, a recording of an interaction with a user and a screen recording related to the interaction may be obtained; a unique ID value related to the user may be extracted from the screen recording; the identity of the user may be determined or resolved using the extracted unique ID value; and the user may be associated or linked with the recorded interaction by associating the unique ID value with the interaction.

The unique ID value and information in a database may be used in order to resolve or determine a unique user identifier of the user; and the unique user identifier may be used to associate or link the recorded interaction with the user. Obtaining a recording of an interaction and a screen recording may include searching a database for interaction recordings that are associated with screen recordings. A voice print may be created based on a recorded interaction; and the voice print may be used in order to associate additional recorded interactions with the user.

A graphical user interface (GUI) configuration tool may be used to receive, from a user, an indication of a location of a unique ID value in a screen presented by an application. A first unique user identifier of a first type may be obtained, for a first user; a second unique user identifier of a second type may be obtained, for a second user; and a respective first and second unique ID values, of the same type, may be determined based on the first and second unique user identifiers. A frame in the screen recording may be analyzed in order to determine; whether or not the frame includes a predefined portion of a predefined screen; and, if the frame does not include the predefined portion of a predefined screen then an additional frame of the screen recording may be processed, and if the frame includes the predefined portion of a predefined screen then a unique ID value may be extracted from the frame.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
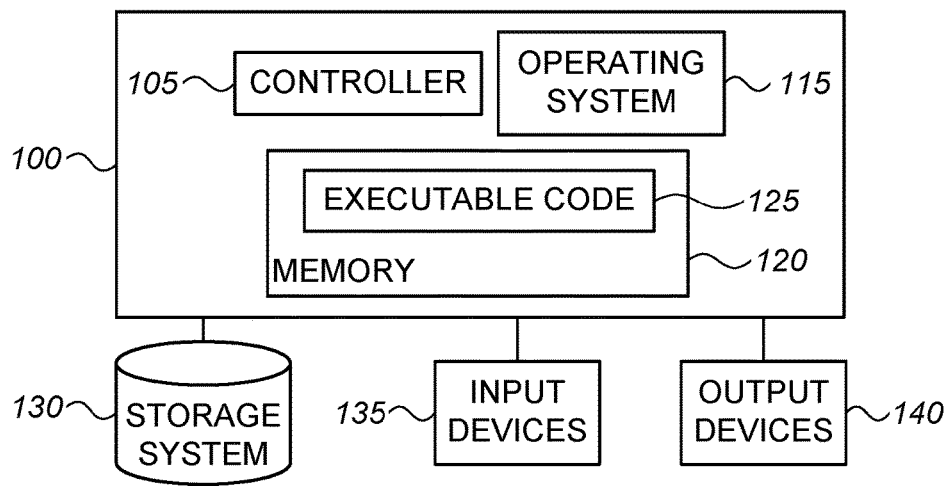
FIG. 1 shows high level block diagram of an exemplary computing device according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included, and one or more computing devices 100 may act as the various components, for example the components shown in FIG. 2. For example association unit 215 described herein may be, or may include components of, computing device 100. For example, by executing executable code 125 stored in memory 120, controller 105 may be configured to carry out a method of associating a user with an interaction as described herein. For example, controller 105 may be configured to obtain a screen recording, extract or determine a unique ID value related to a user from the screen recording, use the unique ID value in order to determine or resolve the identity of the user and associate or link the user with a the screen recording and/or with a recorded interaction. A unique ID may be unique within a particular computing environment or database. Associating or linking a user with a screen recording and/or with a recorded interaction may include assigning the screen recording and/or recorded interaction to the user.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that associates a user with an interaction or assigns an interaction to a user as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., association unit 215) may be, or may include, controller 105, memory 120 and executable code 125.

Storage system 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors (e.g., on which screens are displayed), speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

A system and method according to some embodiments of the invention may leverage screen recordings, e.g., stored in a database on site for extracting or determining valuable end-user information from recorded screen activity. For example and as described, metadata or identifiers of a user such as a social security number (SSN), an account ID, an electronic mail address (email), a telephone number and the like may be extracted or determined from a screen recording. A system and method according to some embodiments of the invention may associate an identified user with a recorded interaction, or assign an interaction to a user as further described herein.

Figure 2:
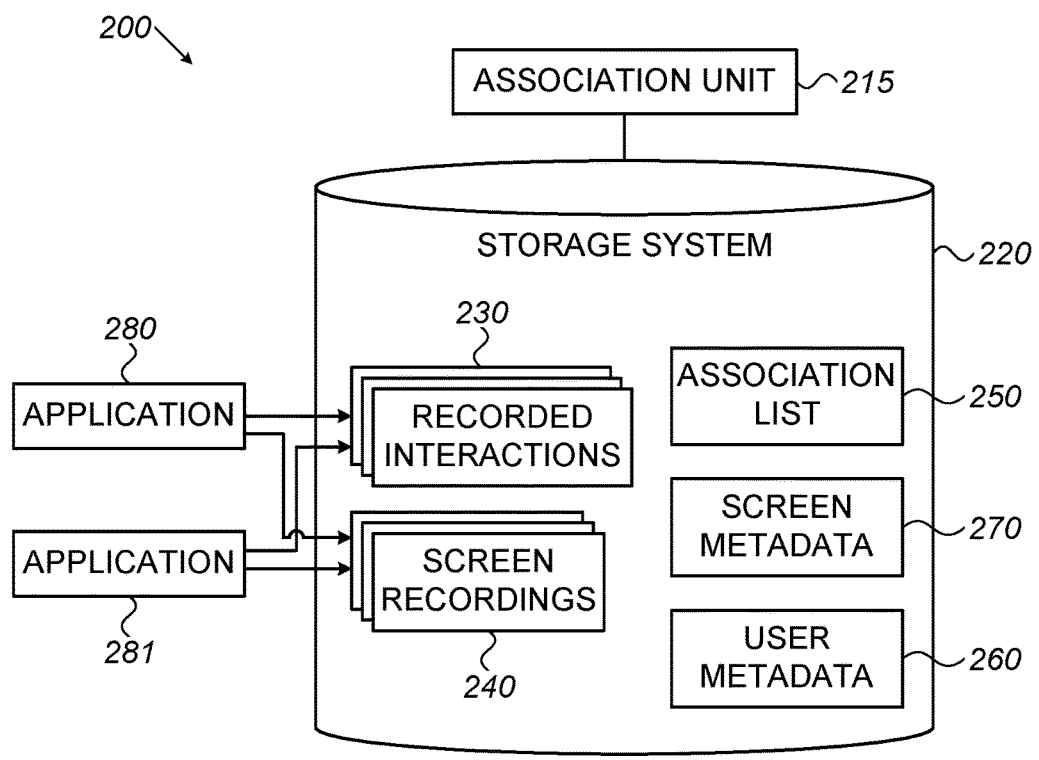
FIG. 2 is an overview of a system according to illustrative embodiments of the present invention.

Reference is made to FIG. 2 that shows a schematic block diagram of a system 200 according to illustrative embodiments of the present invention. As shown, a system 200 may include an association unit 215 and a storage system 220. As shown, storage system 220 may include or store recorded interactions 230, screen recordings 240, an association list 250, screen metadata 270 and user metadata 260.

Applications 280 and 281 may be any applications used when interacting with customers, callers and the like. For example, application 280 may be a desktop or server-based application used by agents in a contact center when the agents talk to, or serve, callers or customers as known in the art and application 281 may be a web based application used by sales representatives in an organization as known in the art. For example, as known in the art, contact centers and other organizations use applications that provides an agent with information related to a caller or customer, e.g., an application that interacts with a customer relation management (CRM) system, for example, when a call comes in, application 280 may retrieve from a CRM or other database the name, purchase history and other information of the caller and present this information to an agent who is handling the call. Application 280 may also enable the agent to record information, e.g., record a purchase, complain etc. A screen recording as described herein (e.g., included in screen recordings 240) may be a recording (e.g., a set of frames as known in the art) of a screen presented to an agent such that interactions of the agent with application 280 are recorded as well as possibly, any information presented to the agent. For example, a screen recording may be a digital recording of a computer screen output as known in the art.

Screen recordings 240 may include recordings of screens (e.g., information displayed to customer service representatives interacting with the user or other data displayed to or viewed by a customer service representative using a graphical user interface (GUI)) that were made or created when applications 280 or 281 were used. For example, a session involving a customer and an agent (e.g. a call center worker, customer service representative, etc.) using application 280 may be recorded by continuously recording screens displayed by application 280. Accordingly, screen recordings 240 may include any or all graphical data presented by application 280 when executed and/or interacted with. Recorded interactions 230 may be any recordings, e.g., an audio recording of a telephone call, a recording of a chat session and the like. Association unit 215 may be, or may include components of computing device 100, e.g., a controller 105 and a memory 120.

Storage system 220 may be similar to storage system 130 described herein. In some embodiments, storage 220 may be, or may include a database as known in the art, recorded interactions 230, screen recordings 240, an association list 250, screen metadata 270 and user metadata 260 may all be stored in the database.

User metadata 260 may be, or may include any data or information of, or pertaining to, users. For example, user metadata 260 may include, for each of a large number of customers or users, a user's name, a user's telephone number, a user's home address, a user's email address, a user's SSN, a user's account ID and the like. Using a database as known in the art, a value identifying a user may be used to retrieve from a database all information related to the user. For example, using a customer ID value of a customer or user, the SSN, name, home address and the like may all be retrieved from user metadata 260 in a database (e.g., in storage system 220).

Screen metadata 270 may include data and information related to screens displayed by applications 280 and 281. For example, screen metadata 270 may include an image of a header and/or an image or value of a specific field in a screen (e.g., an image and value of a "Customer ID" field as described herein). Data in screen metadata 270 may be used in order to identify the application that produced a screen recoding as further described herein.

Association list 250 may include data and/or information that associates, assigns or links recorded interactions included in recorded interactions 230 with users. Association list 250 may include data and/or information that associates users with screen recordings included in screen recordings 240. For example, a list or other construct may assign a recorded interaction to a user.

Association list 250 may include data and/or information that associates recorded interactions included in recorded interactions 230 with screen recordings included in screen recordings 240. For example, an entry or row in association list 250 may include a user a unique ID value (e.g., an SSN or Customer ID) that uniquely identifies a user and the entry or row may further include a reference to a recorded interaction in recorded interactions 230 thus, the user may be associated with the recorded interaction or the recorded interaction may be assigned to the user. An entry or row in association list 250 may include any data identifying, or related to, a user, caller or customer, and may further include references to screen recordings related to the user and a reference to metadata of the user (e.g., in user metadata 260). It will be understood that association list 250 (and its use as described herein) is a simplified example and that other configurations, systems or methods may be used in order to associate, assign or link users, screen recordings and interaction recordings as described herein. For example, linked lists, references or pointers and/or database structures and logic as known in the art may be used in order to associate a user with a recorded interaction and/or associate a unique ID value of a user with a recorded interaction and/or with a screen recording.

In some embodiments, a system and method may associate or link a user (or information of the user) with one or more recorded interactions. For example, after identifying a user based on a screen recording, the identified user may be associated with an audio recording of a telephone call involving the user and an agent in a contact center. As described, in some embodiments, a system and method may use a screen recording to determine or resolve an identity of a user, customer, or end-user, and may further associate the user, customer, or end-user with recorded interactions. For example, association unit 215 may obtain a recording of an interaction with a user from recorded interactions 230 and a screen recording related to the interaction, extract or determine, from the screen recording, a unique ID value related to or identifying the user and resolve or determine an identity of the user using the extracted unique ID value. For example, extracting or determining a unique ID may include using optical character recognition (OCR) or other techniques as known in the art. Resolving or determining an identity of a user may include finding and/or retrieving some or all the information of the user from user metadata 260. Association unit 215 may associate the user with a recorded interaction by associating the unique ID value with the interaction, for example, by recording, in association list 250 the unique ID value and a pointer, reference or identifier of a recording of the interaction.

In some embodiments, a method or flow may include a configuration stage or phase during which a user may configure a system such that data or information usable for identifying a user can be extracted from screen recordings related to an application. For example, a screen may be related to an application that was used when the recording was made. For example, if a first screen recording included in screen recordings 240 was made, created or captured while an agent was using application 280 and a second screen recording included in screen recordings 240 was made, created or captured while an agent was using application 281 then the first screen recording may be related to application 280 and the second screen recording may be related to application 281. A screen recording as referred to herein may be as known in the art, e.g., include one or more screenshots of screens displayed by an application when the application is executed or interacted with. For example, a screen recording may include an array or set of screenshots usable for displaying or reproducing, on a computer monitor or display, a set of screens displayed by the application. A screen recording or a screenshot of a screen as referred to herein may be, or may include, a bitmap, an array or set of values or parameters of, or representing pixels, or any other information, data or parameter that may represent a screen produced by an application and/or usable to present or reproduce the screen. In some embodiments, a GUI configuration tool (e.g., provided by, or included in, association unit 215) may receive, from a user, an indication of a location of a unique ID value in a screen presented by an application. For example, a GUI tool may present, to a user or administrator, a screenshot of a screen displayed by application 280 and the user may mark, in the screenshot, a field, an element or a region. The GUI tool may record (e.g., in screen metadata 270) the screen and the element, field or region in the screen such that the marked or indicated element, field or region can be used in order to process screen recordings as described herein.

Figure 3:
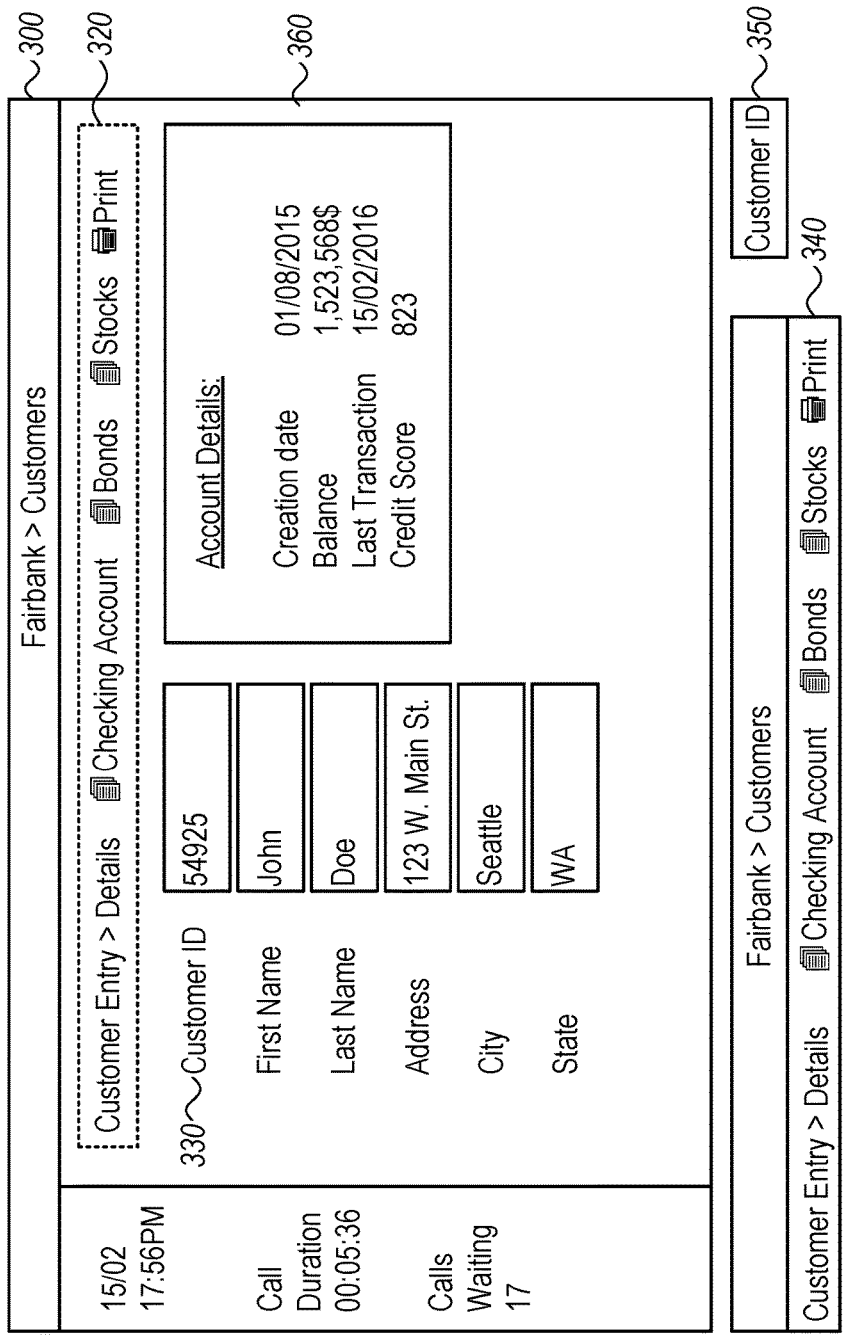
FIG. 3 shows an exemplary screenshot of an application according to illustrative embodiments of the present invention.

Reference is made to FIG. 3 that shows an exemplary screenshot 300 of a screen displayed by an application. For example, screenshot 300 may be presented or displayed by application 281 when executed or used by an agent in a contact center. As shown, screenshot 300 may include a form 360 that includes a large number of graphical objects or elements, fields and entries, including a header 320 element and a "Customer ID" 330 element that may be any suitable field, entry, parameter or value. For example and as shown, the "Customer ID" value may be "54925". According to some embodiments, some of the objects, elements, fields and/or entries may include a label and a value. For example, the "Customer ID" portion or box in element "Customer ID" 330 may be a label and the "54925" portion or box in element "Customer ID" 330 may be a value.

For example, a customer's ID value of "54925" may uniquely identify a specific or particular customer or user in a contact center and may accordingly be used as a unique ID value for that specific user. For example, automated systems automatically assign unique customer ID values to callers, customers or users.

An embodiment may analyze a frame (e.g., an image or other representation of a screen shown to a user at one moment in time) in a screen recording, e.g., screenshot 300 may be a frame in a screen recording that is analyzed by association unit 215. Based on analyzing a frame, an embodiment may determine whether or not the frame includes a predefined portion of, or, a predefined screen. For example, association unit 215 may determine whether or not a screenshot or frame includes a known or predefined header as described herein.

If an embodiment determines that an analyzed or processed frame does not include a predefined or searched for portion of a predefined screen then an embodiment may analyze or process an additional frame of a screen recording. If an embodiment determines that an analyzed or processed frame includes a predefined or searched for portion of a predefined screen then an embodiment may extract a unique ID value from the frame. For example, a predefined or searched for portion of a screen may be a header as described herein, however, it will be understood that any portion of a screen may be searched for. For example, a specific pattern in a predefined area or region of a screen may be searched for, or a specific pattern, element or graphical element may be searched for in frames of a screen recording. Accordingly, a specific screen displayed by an application may be found in a set of frames and a unique ID value may be extracted from a frame that includes the specific or searched for screen or portion. For example, a portion of a screen (or metadata related to a screen) that can be used in order to identify a screen (or identify an application that produces the screen) may be stored and used in order to determine whether or not a frame was produced by a specific application.

In some embodiments, in order to determine or identify the application related to a screenshot or screen recording, a header may be identified and stored or recorded. For example, a user may mark header 320 (e.g., by drawing a rectangle around header 320 using a GUI tool as described herein) and, based on the user's marking or input, an image of header 320 may be stored (e.g., in screen metadata 270).

A system and method according to some embodiments of the invention may use a stored header (or image of a header) in order to determine whether or not a screen recording is related to a specific application. For example, assuming the screen shown by screenshot 300 is produced or displayed by application 281, an image that includes header 320 as shown by block 340 may be stored in screen metadata 270 and may be used in order to identify screens produced by application 281.

For example, a system and method according to some embodiments of the invention may search for header 320 (e.g., using image 340) in screen recordings 240 and, if header 320 is found in a screen recording, a system and method according to some embodiments of the invention may associate the screen recording with the application that produced the screen shown by screenshot 300 (e.g., application 281). An element, object or region that may be used to uniquely identify a user may be marked by a user and may be stored. For example, an image that includes a customer ID as shown by block 350 may be stored in screen metadata 270 and a value of the customer ID may be used in order to uniquely identify a user.

In some embodiments, a GUI configuration tool may be used in order to receive, from a user, a mark, a type, an indication or any other information, attributes or metadata related to a unique ID parameter, field or value, presented in a screen of an application. For example, a location of a unique ID parameter (e.g., relative coordinates), a type of a unique ID parameter (e.g., a type of "SSN", "NAME", string, numeric etc.) and a value (e.g., a number or string) may be received from a user and may be used, e.g., in order to detect a unique ID parameter field or value, presented in a screen of an application as described herein.

A type of a field or element in a screen may be provided by a user. For example, using a GUI tool, a user may draw a rectangle around an element in a form (e.g. header 320) and may further use a pulldown menu to select an element type (e.g., the type "Header" may be selected for header 320). Other attribute for a marked element may be selected or set. Based on input from a user, in some embodiments, a system and method may store an image (or partial screenshot) of header 320 of, or in, the screen shown by screenshot 300, and use the header image in order to identify screen recordings of the application. For example, in order to find screen recordings of, or related to, the application that produces or displays the screen shown by screenshot 300, in some embodiments, a system and method may store an image of header 320, may examine a set of screen recordings 240 and, if header 320 is identified in a screen recording, in some embodiments, a system and method may determine that the screen recording is related to the application that presents or displays the screen shown by screenshot 300. Accordingly, a user may teach a system and method according to some embodiments of the invention how to track valuable information in a screen displayed by an application and/or how to associate a screen recording with an application.

It will be understood that a system and method according to embodiments of the invention may be applicable to any application that displays or presents graphical data, objects or screens. For example, the application that presents the screen shown by screenshot 300 (e.g., one of applications 280 and 281) may be a web (e.g., via the Internet and browsers) application, a desktop application or any application as known in the art. It is noted that since identification of the relevant application (e.g., using a header image as described) and identification of the user whose data is presented in a screen may be done using image and/or graphic analytic processes and, therefore, a system and method according to embodiments of the invention may be indifferent to the type of application whose screens are analyzed or processed as described.

Accordingly, in some embodiments, a system and method may track relevant attributes in screenshots or screen recordings of an application. For example, a header may be tracked or identified in screen recordings and a parameter or value that uniquely identifies a user may be tracked or identified in screen recordings.

Association unit 215 may review or examine recorded interactions 230 and may categorize them into two types: ones that are associated with screen recordings, and others that are not. For example, in some cases, a database may include information that associates a screen recording (e.g., included in screen recordings 240) with a voice or interaction recording or with a recorded interaction (e.g., included in recorded interactions 230). For example, a system in a contact center may record a conversation of an agent with a customer, may record the screen of the agent and may store information in a database that links or associates the recorded interaction and the screen recording, e.g., using lists, tales or references as known in the art. A screen recording may be as known in the art, e.g., it may be a set of frames, snapshots or screenshots of a screen. A recording of an interaction may be voice recording as known in the art.

For example, association unit 215 may identify, in recorded interactions 230 the recorded interactions that are associated with screen recordings in screen recordings 240. For example, when a recording of a telephone interaction is stored in storage system 220, if a screen recording related to the interaction is made or is available, an association list (e.g., one similar to association list 250) or other data or methods may be used in order to associate or link the recording of the telephone interaction with a screen recording. For example, as known in the art, in some embodiments, a system and method may record a telephone call and the screen of an agent and may store the recorded call and recorded screen activity such that they are associated or linked (e.g., using linked lists, pointers or database management data as known in the art). It is noted that interactions (of any type) can be captured and recorded with or without screen activities. For example, voice interaction: an agent can provide voice service to an end-user while the agent's screen activity is recorded. On the other hand, a different agent can provide voice service to an end-user while his screen activity is currently not recorded, for any reason. In some embodiments, finding the recorded interactions that also have (or are associated with) screen recordings may be done by querying a database as known in the art. For example, a database in a contact center may enable using a number, a name, or other ID of an interaction in order to be provided with any data related to the interaction, included a recording of a screen of the agent who participated in the interaction.

Association unit 215 may examine a screen recording that is associated with a recorded interaction and may identify or determine that application that produced or displayed the screen included in the screen recording. For example, using image 340, association unit 215 may identify that header 320 is included in a screen recording and, using a table, may determine that application 281 is the application that produced the screens in a screen recording. For example, a list may associate header 320 with application 281, accordingly, upon identifying header 320 in a screen recording, association unit 215 may readily associated or link the screen recording with application 281.

Possibly after determining or identifying the relevant application, association unit 215 may search for a parameter or value that uniquely identifies a user. For example, screen metadata 270 may include an association between header 320 and customer ID 330 such that if association unit 215 determines that a screen recording includes header 320 then association unit 215 known it needs to search for customer ID 330.

For example, association unit 215 may play-back a screen recording as known in the art, examine or analyze the screens displayed, may determine that the screen recording includes header 320 and may therefore search for customer ID 330 in the recorded screen activity. Once the field customer ID 330 is identified in a screen recording, the value in the field (e.g., "54925" in the example shown in FIG. 3) may be extracted, e.g., using OCR or other techniques as known in the art. As discussed, a customer ID value may uniquely identify a customer. Accordingly, association unit 215 may associate a specific customer with a screen recording, and, using an association of the screen recording with a recording of an interaction (e.g., an audio recording), association unit 215 may associate the customer or user with a recorded interaction. As described, associating a customer or user with a recorded interaction and/or a screen recording may be, or may include, updating an association list such as association list 250.

Figure 4:
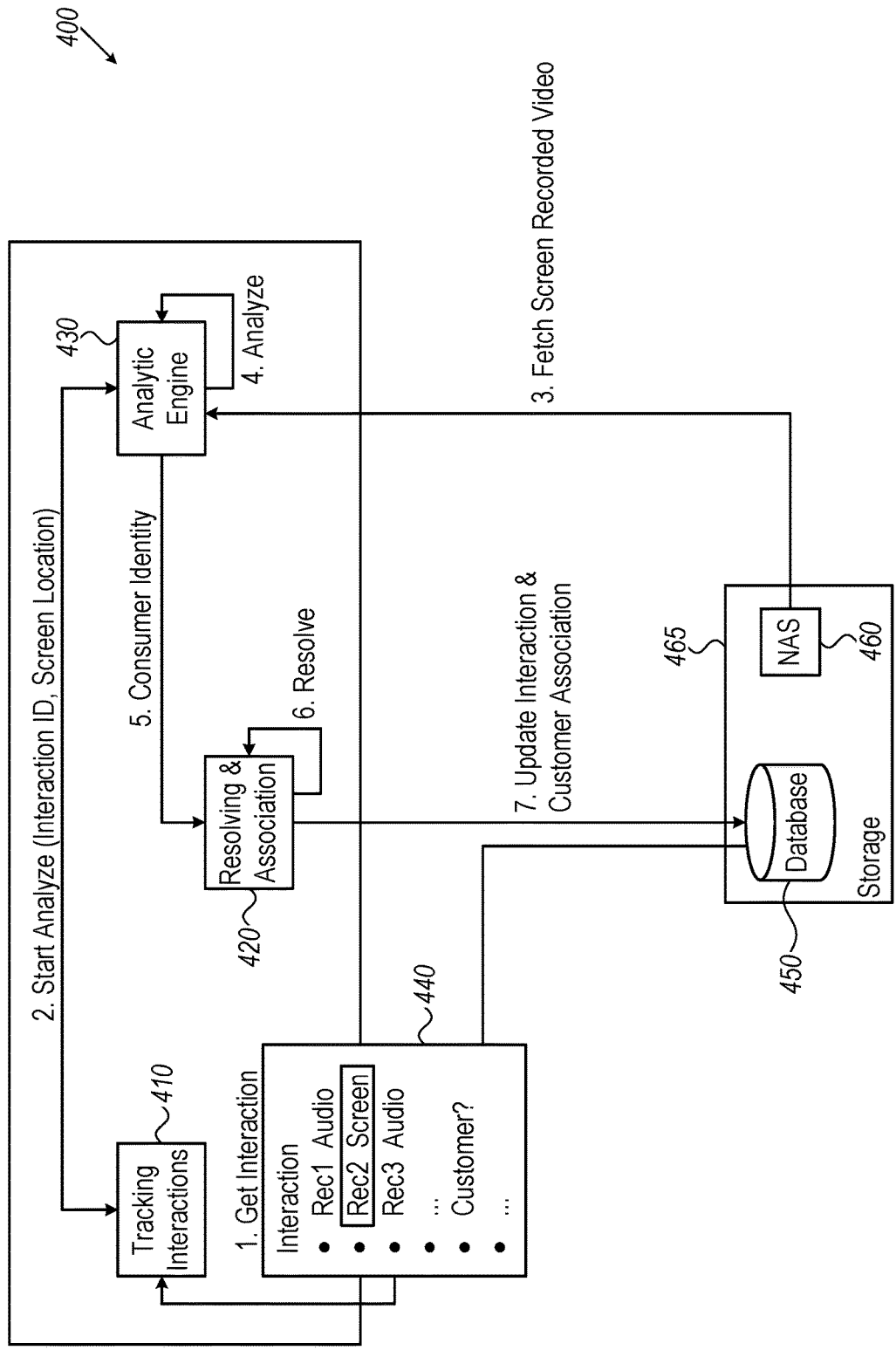
FIG. 4 is an overview of a system and flows according to illustrative embodiments of the present invention.

Reference is made to FIG. 4 which shows an overview of a system 400 and flows according to illustrative embodiments of the present invention. As shown, a system 400 may include a tracking interactions unit 410, a resolving and association unit 420, an analytic engine 430, a storage system 465 that may include a database 450 and a network-attached storage (NAS) 460. Storage system 465 may be, may be included in, or may include storage system 130. For example, database 450 may include storage system 130 and a database management system (DBMS) and may store or include recorded interactions 230, screen recordings 240, association list 250, user metadata 260 and/or screen metadata 270. NAS 460 may be, or may include any network storage system as known in the art and may include or store screen recordings screen recordings 240 or other data.

Each of: tracking interactions unit 410, resolving and association unit 420, and analytic engine 430 may be, or may include components of, computing device 100, e.g., these units may each include a controller 105 and a memory 120, or may be executed by one or more processors such as controller 105. In some embodiments, tracking interactions unit 410, resolving and association unit 420, and analytic engine 430 may be included in a single unit, e.g., tracking interactions unit 410, resolving and association unit 420, and analytic engine 430 may be included in association unit 215, accordingly, any operations carried out by tracking interactions unit 410, resolving and association unit 420, and analytic engine 430 may be carried out by association unit 215. Accordingly, methods according to embodiments of the invention may be carried out by a system, device or article that includes a controller and memory, e.g., controller 105 and memory 120.

Tracking interactions unit 410 may fetch, from database 450, relevant interactions, e.g., recorded interactions that are associated with available screen recordings. For example, tracking interactions unit 410 may query database 450 and request recorded interactions for which screen recordings are available. As described, when a recording of an interaction between an agent and a user or customer (e.g., recording of a telephone call) is stored in database 450, if a recording of screen activity (screen recording) of the agent is made and available, the screen recording may be stored in database 450 in association with the stored recorded interaction, e.g., using pointers, references or other methods used by databases as known in the art. Accordingly, tracking interactions unit 410 may receive from database 450 recorded interactions and, for each recorded interaction, tracking interactions unit 410 receive from database 450 a screen recording related to the interaction.

Tracking interactions unit 410 may send the interactions retrieved from database 450 as described to Analytic engine 430. Analytic engine 430 may fetch screen recordings from a storage, e.g., from NAS 460 as shown or from any other storage (e.g., from storage 220 as described. Analytic engine 430 may process the screen recording and may search for relevant application/windows appearance on the screen. For example, using information in screen metadata 270, Analytic engine 430 may search for header 320 in screen recordings. When identifying a header in a screen recording, Analytic engine 430 may search for a specific attribute, parameter or identifier in a screen recording. For example, information in screen metadata 270 may include or indicate that if header 320 is found then the application that produces the screens is application 281 and the unique user identifier is customer ID 330 that may be found at specific coordinates within a screen displayed by application 281 or may include a pattern such as "Customer ID".

An output or result from analytic engine 430 may be provided to resolving and association unit 420. For example, an output provided by analytic engine 430 to solving and association unit 420 may include a unique user identifier (e.g., an SSN or a customer ID such as the value of "54925"). Association unit 420 may update metadata in storage 465. For example, Association unit 420 may update an association list 250 or any other data structure usable for storing or including data that associates a user with recorded interactions and/or with screen recordings.

Recorded interactions to be processed, e.g., in attempt to be associated with users, may be selected based on various conditions or configuration parameters. For example, database 450 may include or store thousands of recorded interactions and tracking interaction unit 410 may select recorded interactions for examination or processing based on conditions or rules provided by a user. For example, tracking interaction unit 410 may receive a date and time frame value (e.g., Tuesday, Dec. 29, 2015, 09:00 until 18:00) and may select for processing only recordings of interactions that occurred in the specified time value. Tracking interaction unit 410 may select for examination only recordings of interactions that are associated with screen recordings. For example, a list in, or query to, database 450 may be used in order to determine whether or not a screen recoding was made for an interaction that was recorded, e.g., whether or not an audio recording of a conversation was made for a conversation of an agent with a client and, in addition, a recording of screen activities on the agent's screen was made, and accordingly, both a recording of the interaction and a recording of a screen related to the interaction are available. Tracking interaction unit 410 may select for processing only interactions that are not associated with a user or customer (e.g., since associating such interactions may be redundant).

Analytic engine 430 may receive a screen recording (and an associated recording of an interaction) as input and may render, in a memory, screens captured in the screen recording to create frames that may include screenshots or bitmaps as known in the art. In order to improve speed and efficiency, analytic engine 430 may play back (or process) frames at a low rate or time resolution, for example 1 frame per second. By making the low rate compromise, analytic engine 430 may be able to process a larger number of interactions per time unit. For example, analytic engine 430 may retrieve or receive from NAS 460 a stream of a screen recording, e.g., in the form of packets, convert the stream into frames (e.g., using a screen renderer unit) and analyze the frames.

For example, using information in screen metadata 270 that defines a location and/or size of a graphical element in a screen, and/or a pattern to be matched or found in a screen (e.g., the location, size and/or pattern of header 320), analytic engine 430 may determine whether or not an element is present or included in a screen (or a screenshot of a screen rendered in memory). It will be understood that screen metadata 270 may include any data or information usable for identifying screens and elements in screens as described herein. For example, information usable in order to identify or detect the customer ID element 330 in a screen, a bitmap of that element or a pattern of the text "Customer ID" may be stored in screen metadata 270. For example, In order to identify the header element 320 in a screen shown by screenshot 300, attributes such as a color frequency or histogram may be stored in screen metadata 270. For example, when analyzing a frame of a screen recording, analytic engine 430 may first determine whether a specific percentage of pixels in a region specified by a rectangle drawn by a user as described are blue and may quickly determine that a screenshot or frame being analyzed is not of application 281, e.g., since most of the pixel in the region of header 320 are yellow and not blue as indicated, for screens of application 281, in screen metadata 270. Accordingly, any system and method may be used by embodiments of the invention in order to identify screens and associate them with a user. For example and as described, pattern matching may be used in order to identify the application that produced an analyzed screen (or screenshot representing a screen) and, once the application is identified, information in screen metadata 270 may indicate or be used in order to locate a unique ID value related to the user included in the screen. For example, having determined that header 320 is included or present in a screenshot or frame produced based in a screen recording, analytic engine 430 may determine that the application that produced the screens in the screen recording is application 281. Analytic engine 430 may search screen metadata 270 for data related to application 281 and may find that a unique ID value of a user is the customer ID 330 element. Information in screen metadata 270 may include any information needed by analytic engine 430 in order to extract the value of the customer ID element. For example, information related to application 281 may include a location and size of customer ID 330 element, a pattern in this element, a color of the element and the like.

A system and method according to some embodiments may search for a predefined form in a screen recording. A form may be or may be included in, a screen presented or displayed by an application. Generally, a form may be a screen displayed by an application where the screen displays information and possibly enables a user to input information. For example, the screen shown by screenshot 300 may be or may include a form as shown in FIG. 3. A form may be searched for in a screen recording and specific elements in the form (e.g., header 320 and customer ID 330) may be searched for and/or identified.

In some cases, the size or scale of a screen or form may vary or it may not be known in advance. For example, a form may be displayed in full-screen mode as known in the art, e.g., the form may cover or occupy an entire screen or monitor or the form may only be displayed on a portion of the screen or monitor, e.g., when the size of the window that includes the form is decreased, e.g., made to cover only a portion of a display screen as known in the art.

Logic executed by association unit 215 or analytic engine 430 as described herein may be robust with respect to different transformations of a form in the frame. For example, a form may have a different size or location within a frame or screenshot. In some embodiments, a system and method may calculate a ratio between a height and width of an element as defined or included in screen metadata 270 and the height and width of the element as identified or found in a screen recording or screenshot and use the ratio in order to determine or calculate the dimensions of a form cropped from an image.

Figure 5:
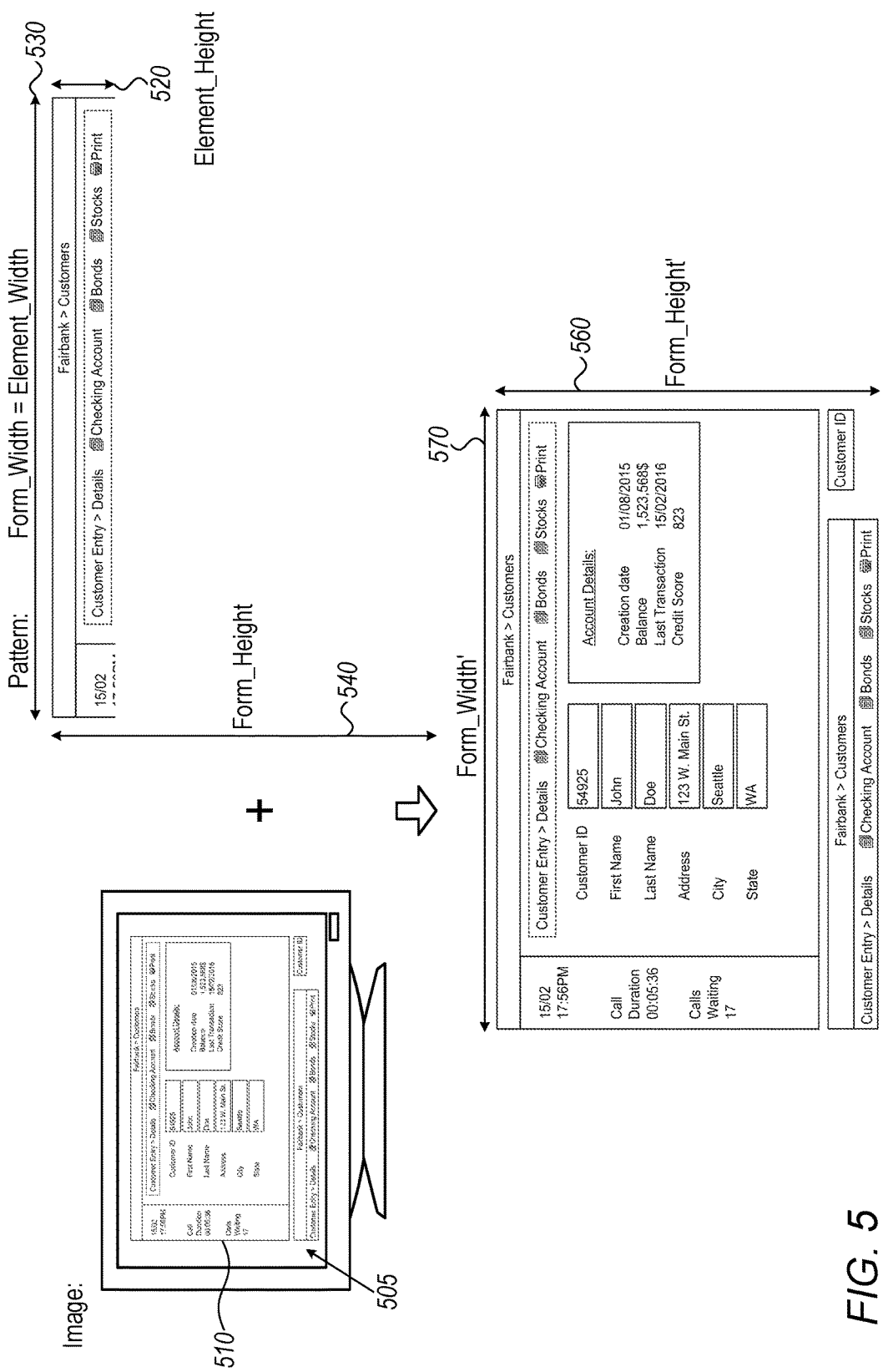
FIG. 5 schematically illustrates a method according to embodiments of the present invention.

Reference is made to FIG. 5 that graphically illustrates identifying a form and elements in the form in accordance with some embodiments of the invention. Since, as discussed, the size of a form as captured in a screen recording may not be known in advance, some logic may be used in order to identify and/or characterize a form and elements in a form.

In some embodiments, an input to a method or system may include an image that includes a form and metadata related to the form and/or to elements in the form. For example, screen 505 may be an image (of a screen) that includes form 510.

Metadata that may be provided as input by, or retrieved from screen metadata 270 may include the height and width of the form and of elements in the form. For example, the dimensions of header 320 as obtained from screen metadata 270 (denoted in FIG. 5 as {Element_Height, Element_Width}) may be provided as input. For example, Element_Height may be as shown by height 520 and Element_Width may be as shown by width 530.

The dimensions of form 510 as obtained from screen metadata 270 (denoted in FIG. 5 as {Form_Height, Form_Width}) may be provided as input to a system and method according to embodiments of the invention. For example, Form_Height may be as shown by height 540 and Form_Width may be as shown by width 530. It is noted that FIG. 5 shows a case where the width of an element in a form and width of the form are the same.

In some cases, {Element_Height, Element_Width} may be the dimensions of header 320 as recorded in a configuration stage as described, e.g., based on a display of header 320 in full-screen mode as shown in FIG. 3, accordingly, when presented in a smaller window as shown in FIG. 5, the dimensions of header 320 may be different and a scaling may be required in order to properly identify elements in form 510, e.g., identify header 320 and the customer ID field 330. Similarly, the dimensions of form 510 as recorded in screen metadata 270 may be as identified when form 510 was displayed in full-screen mode as shown in FIG. 3.

Using pattern matching or other image processing techniques known in the art, analytic engine 430 or association unit 215 may search for form 510 in screen or image 505. If a form is found in an image, the form may be cropped from the image as known in the art and the cropped form may be provided as output of a method or system. A system and method according to some embodiments of the invention may provide (e.g., association unit 215), as output, the dimensions of the cropped form (denoted herein as {Form_Height', Form_Width' }).

For example, the dimensions (height and width) of form 510 may be calculated by:

$R_X$=Element_Width'/Element_Width $R_Y$=Element_Height'/Element_Height

Form_Height'=Form_Height*$R_Y$

Form_Width'=Element_Width'=Form_Width*$R_X$

Where Element_Width' is the width of an element as measured or identified in a cropped form (e.g., as shown by width 530), Element_Width is the width of an element as received from screen metadata 270 (e.g., the width of header 320 as shown in FIG. 3), Form_Height is the height of a form received from screen metadata 270 (e.g., the width of form 360) and Form_Width is the width a form as received from screen metadata 270 (e.g., the height of form 360). The dimensions of a form, e.g., {Form_Height', Form_Width'} as respectively shown by 560 and 570 may be provided as output together with a cropped portion of an image which matches the form (e.g., a cropped portion of image 505 that includes form 510).

Dimensions of a field, attribute or element in a form cropped from an image may be calculated. A field as referred to herein may include both a label (e.g., "Customer ID") and a value (e.g., the value "54925"). As described, a system and method according to some embodiments of the invention may determine dimensions of a field in a cropped image and extract a value from the field.

Figure 6:
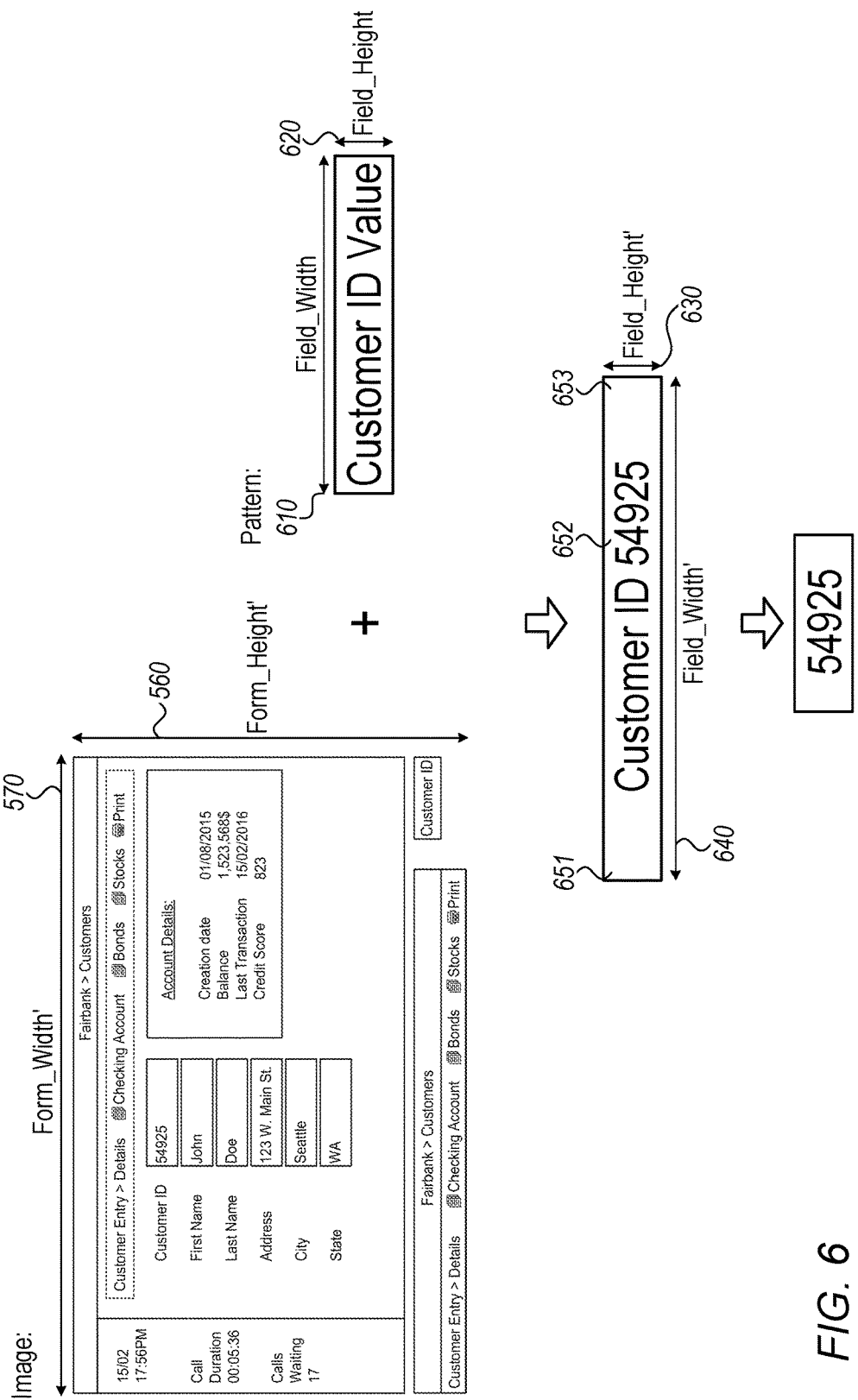
FIG. 6 schematically illustrates a method according to embodiments of the present invention.

Reference is made to FIG. 6 which illustrates a method according to embodiments of the present invention. A system and method according to some embodiments of the invention may receive, as input, a cropped portion of an image that includes a form having a width 570 and height 560 as shown, e.g., a cropped form as produced by association unit 215 as described herein. In some embodiments, a system and method may receive, as input, an image of an attribute, entry, field or element included in the form. For example, an image and attributes of the field or attribute "Customer ID" 330 in form 360 may be obtained from screen metadata 270. For example, an image of the "Customer ID" 330 field, its value and its dimensions may be stored in screen metadata 270 during a configuration or setup stage as described. As shown, dimensions of an attribute or field provided as input may include the field's width 610 (including the label and value) and the field's height 620 (respectively denoted in FIG. 6 as Field_Width and Field_Height).

In order to calculate or determine the dimensions of a field and its value in a form cropped from an image, $R_X$ and $R_Y$ calculated as described above may be used. For example, the width of the "Customer ID" 330 field in form 510 may be smaller than the width of the "Customer ID" 330 field or entry as stored in screen metadata 270 during setup phase. Similarly, the height of the "Customer ID" 330 field or entry in form 510 cropped from image 505 may be smaller than the height of the "Customer ID" 330 field or entry as stored in screen metadata 270. Accordingly, scaling may be required prior to extraction of a value in a field or entry.

A system and method according to some embodiments of the invention may scale dimensions of field or entry in a cropped form based on the dimensions of the cropped form and based on the dimensions of the field or entry as obtained from screen metadata 270.

For example, the actual width of the "Customer ID" 330 field and its value in cropped form 510 as shown by width 640, and the actual height of the "Customer ID" 330 field in cropped form 510 as shown by height 630 may be calculated as follows:

$$\text{Field\_Height}' = \text{Field\_Height} * R_Y$$

$$\text{Field\_Width}' = \text{Field\_Width} * R_X$$

Where Field_Height and Field_Width are the height and width of a field or entry as recorded in screen metadata 270 and Field_Height' and Field_Width' are the actual height and width of the field in a cropped image.

In order to extract a value of a field or entry, a system and method according to some embodiments of the invention may identify the $P_X$ and $P_Y$ coordinates that define the top left corner of a field, entry or pattern in the cropped form image, e.g., as shown by coordinates or point 651. An embodiment may identify the PValX and PValY coordinates that define the top left corner of a value in a field or pattern in the cropped form image, e.g., as shown by coordinates or point 652. The portion or region, in a field, that contains or includes the actual value in a field may be calculated by:

$$PValX = PX + \text{Label\_Width}'$$

$$PValY = PY$$

$$\text{Val\_Height} = \text{Field\_Height}'$$

$$\text{Val\_Width} = \text{Field\_Width}' - \text{Label\_Width}'$$

Where Label_Width' is the width of a label in a field (e.g., "Customer ID" in field or entry 330), Val_Height is the height of the value in a field (e.g., the portion or region that includes the "54925" value) and Val_Width is the width of the value element, which, in the current example illustrated in FIG. 6 is same as the width of the field containing it.

For example, as illustrated in FIG. 6, PX and PY are shown by point or coordinates 651, PValX and PValY are shown by point or coordinates 652, Val_Height and Field_Height' are shown by height 630, Label_Width' is the horizontal distance between points or coordinates 651 and 652 and Val_Width is the horizontal distance between points or coordinates 652 and 653. Accordingly, a location and dimension of a value in a field may be identified, determined and/or calculated and the value may be extracted. For example, having identified the location, size and shape of a value (or box containing the value) as described, association unit 215 may use OCR or other methods as known in the art in order to extract a numeric or textual value from a region, in a screen recording, or in a frame or image as described, that contains, represents, or includes the value, e.g., in graphical form. Extraction of a value may include associating an extracted value with a confidence level or probability as known in the art. If a confidence level of an extracted value is higher than a threshold, an embodiment may use the extracted value in order to identify a user, otherwise, the value may be discarded and additional images or screenshots in a screen recording may be processed in order to extract a value as described. An output of association unit 215 may include an extracted value as described, e.g., the number "54925", an identification of the screen recording from which the value was extracted and/or an identification of an associated interaction recording. For example, each recorded interaction included in recorded interactions 230 and each screen recording included in screen recordings 240 may be assigned, or associated with, an ID. For example, an ID (e.g., set by a DBMS when a recording is stored in it) may be used in order to uniquely identify and/or retrieve a recording as known in the art. A value extracted as described may be used as a unique ID value for a user. For example, the value "54925" may uniquely identify a customer of a contact center. A unique ID of a user (e.g., based on a unique ID value), recorded interaction ID and recorded screen ID may be used in order to associate a user to recorded interactions and/or to screen recordings. Accordingly, having determined or resolved the identity of a user (e.g., using a unique ID value), an embodiment may associate the user with a recorded interaction (e.g., using the interaction's ID). For example, an entry or row in association list may be updated or created such that it includes a customer ID value, a recorded interaction ID and/or a screen recording ID thus associating the user with a recorded interaction and/or with a screen recording.

According to some embodiments, a unique ID value that uniquely identifies a user, customer or any other entity may be used in order to obtain information related to the user or customer. For example and as known in the art, a query to a database that includes a unique ID value of a person may be responded, by the database, by providing information related to the person, e.g., the person's, SSN, account ID, email address, telephone number, home address or any other information stored in the database.

Resolving or determining the identity of a user may include using a value extracted from a screen recording as described as a unique ID value in a query to a database and thus obtaining information of, or related to, the user, e.g., account ID, telephone number and the like.

Generally, a response from a database to a query as described may either include information for the user as described or an indication that the user does not exist in the database, e.g., the unique ID value is invalid or unknown to the database. If the user does not exist in the database, association unit 215 may create a user with the unique ID value in the database. For example, if a query for a user with customer ID of "54925" is responded with "user does not exist" then association unit 215 may create, in a database, a new user with a customer ID of "54925". As described, association unit 215 may update association list 250 or any other data object such that a user is associated with recorded interactions and/or with screen recordings. For example, a row or entry in association list 250 may be created or updated to include a customer ID value of "54925", an identification, pointer or reference value that identifies a screen recoding (e.g., a full path and name of a file that includes the screen recoding, e.g., a file that includes an array of images) and an identification, pointer or reference value that identifies a recorded interaction (e.g., a full path and name of a file that includes a recording of the interaction, e.g., a file that includes digital representation of audio signals).

Accordingly, an association of a user with a screen recording may be realized, e.g., given a customer ID value, all the screen recordings included in screen recordings 240 may be found in association list 250 and, therefore, readily retrieved from storage 220. It is noted that association list 250 may associate a user with any number of screen recordings and/or recorded interactions. For example, a row or entry of a user in association list 250 may be dynamically extended to include references to a plurality of screen recordings.

In some embodiments identifying elements, labels and values may be based on user input. For example, a GUI tool may present to a user a screenshot, image or form as displayed by an application. For example, screenshot 300 or form 360 may be displayed by a GUI tool. A user may select the application that produces the form. For example, a user may identify form 360 as a form displayed by application 280 when executed and may therefore select, e.g., from a pulldown menu, application 280 as the relevant application. The selected application may be stored in a database in association with the form or screenshot. Other methods may be used in order to associate a form with an application.

A user may select a header in the form. For example, header 320 is selected, marked and/or indicated as a header. An image of a selected or indicated header may be stored in association with the form or screenshot and/or relevant application. Attributes of a form and header may be stored, e.g., relative location in a screenshot, height, width, shape and the like may all be stored, e.g. in screen metadata 270 as described. A user may mark a specific element in a form presented by a GUI tool, e.g., as described with reference to element 330.

Figure 7:
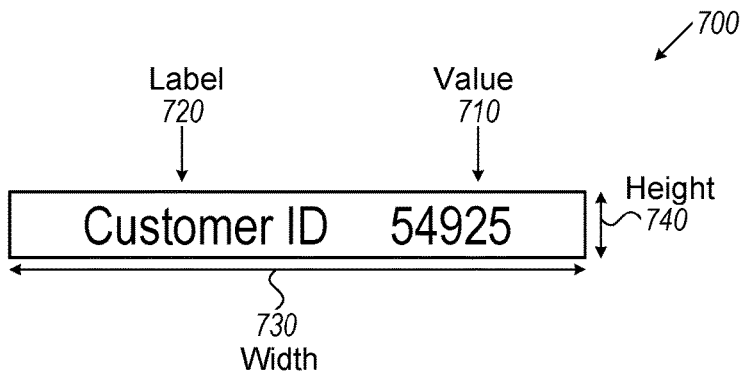
FIG. 7 schematically illustrates a method according to embodiments of the present invention.

Reference is made to FIG. 7 which schematically illustrates a method according to embodiments of the present invention. As shown, an image 700 of an element may be presented to a user. A user may use a marking tool to mark the area that contains a value of the element as shown by value 710 and to mark a label of the element as shown by value 720. A type of a marked area, e.g., a type of "Label" or of "Value" may be set by a user and may be saved, in association with other data related to the element or form, e.g., in screen metadata 270. A user may further mark or indicate a width and height of an element as respectively shown by width 730 and height 740. In some embodiments, some of the attributes of an element may be identified or determined automatically, for example, the height and width of element 700 may be identified using image processing techniques as known in the art. The type of element may be saved, e.g., a type of "Customer ID" or "SSN" may be chosen or set by a user and may be saved, e.g., in screen metadata 270. It will be understood that any information related to a form or element as described herein may be stored such that all information related to a form or element may be readily retrieved, e.g., using a query that includes a form ID, element ID etc. Accordingly, it will be understood that components of a system or method according to embodiments of the invention may readily obtain any information stored for a form or element as described herein.

As described herein, embodiments of the invention address the computer-centric challenge of associating recorded screen interactions and recorded interactions with users. For example, current systems and methods do not enable associating past recorded interactions and screen recordings with users as described.

Figure 8:
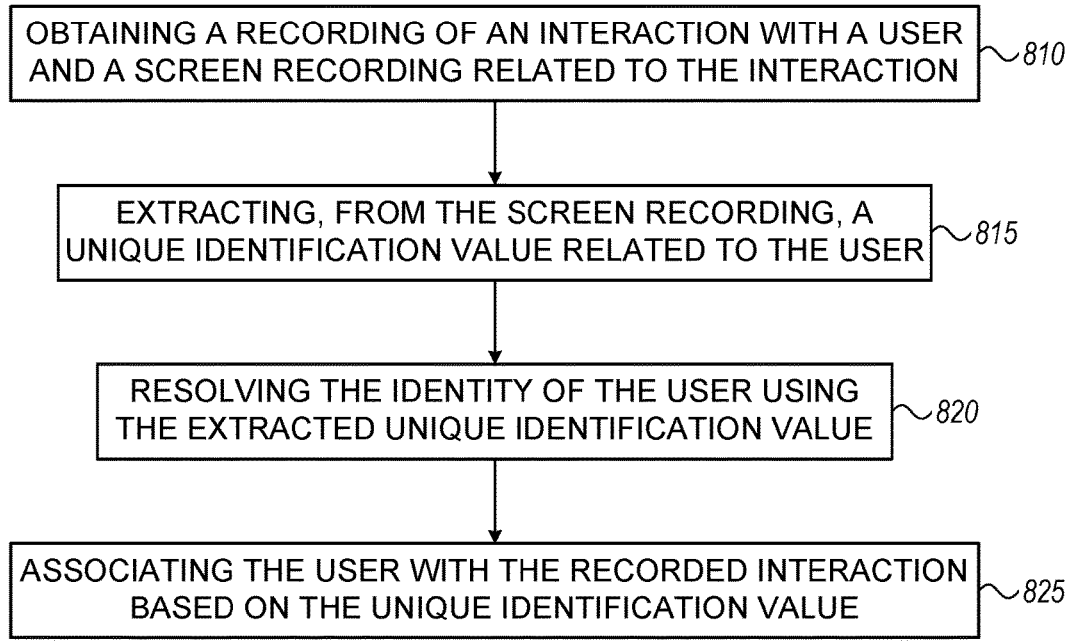
FIG. 8 shows a flowchart of a method according to illustrative embodiments of the present invention.

Reference is made to FIG. 8 which shows a flowchart of a method according to illustrative embodiments of the present invention. As shown by block 810, a recording of an interaction with a user and a screen recording related to the interaction may be obtained. For example, association unit 215 or tracking interactions unit 410 may scan or examine files in storage system 220 or in database 450 and/or in storage 465 and find recording of an interactions for which a screen recordings are also found, or stored in, storage system 220 or in database 450 and/or in storage 465. As described, in many cases, organizations may store (or keep) screen recordings of interactions as well as audio recordings of the interactions, however, although the recorded screen and audio data is stored in a system, the organizations may be unable to associate or link the screen and audio recordings with specific users. For example, historical screen and audio recordings related to interactions held months or years ago may be kept in an organization, but may be useless for the organization since, using prior art systems and methods, the historical recordings cannot be associated with specific users. As described herein, embodiments of the invention may enable associating or linking screen and audio recordings with users or customers thus enabling an organization to use the screen and audio recordings, e.g., determine or identify when a call with a specific user was held, what was discussed, with the specific user in the call and so on. In some embodiments, association unit 215 or tracking interactions unit 410 may scan or examine files in storage system and select for processing only recorded interactions (e.g., audio recordings of interactions) for which screen recordings are also found. For example, a system that records voice interactions may store a recorded voice interaction in a file with a specific name and may further store a screen recording related to the interaction in a file with a similar name, accordingly, in order to find or identify interactions for which both voice recordings and screen recordings exist, a file naming convention may be used. For example, a recording of a conversation of a customer with an agent (who is using a computer) may be stored in a file whose name includes a unique string generated by a recording system, and a recording of the screen of the agent (e.g., a recording of whatever was displayed on the agent's screen during the conversation) may be stored, by the recording the system, in another file whose name also includes the unique string. Any other methods may be used in order to identify recorded interactions for which a recording of an agent's screen can be found or located and association unit 215 or tracking interactions unit 410 may use any system or method known in the art in order to identify or select for processing interactions for which both recoded audio and a screen can be found in a storage system.

As shown by block 815, a unique ID value related to the user may be extracted from a screen recording. For example, screenshot 300 may be a frame included in a screen recording and analytic engine 430 or association unit 215 may (possibly using metadata as described) identify the "Customer ID" field as a unique ID field. Analytic engine 430 or association unit 215 may identify the label portion of a field or portion in a screen, e.g., identify label 720 as shown by FIG. 7. Analytic engine 430 or association unit 215 may identify a value portion in a field or entry, e.g., identify value 710 as shown by FIG. 7. Analytic engine 430 or association unit 215 may extract or obtain, from a screenshot or frame, a unique ID value for a customer or user. For example, in the exemplary case shown by FIG. 7, the value of "54925" may be extracted and may be used as a unique ID value. As described, a customer ID may be associated with, or given to, customers such that it is unique and no two customers share the same customer ID, accordingly, a customer ID value such as "54925" may uniquely identify one specific user or customer. A unique ID value provided by analytic engine 430 or association unit 215 may be provided to and/or used by, any component in systems 200 or 400 as described.

As shown by block 820, an identity of a user may be resolved using an extracted unique ID value. Resolving an identity of a user may generally include obtaining information related to the user e.g., demographic information stored in a local database or information in the internet, shopping or call history and the like. For example, a query that includes a customer ID value of "54925" may be sent to database 450 or NAS 460 (e.g., by resolving and association unit 420) and a response to the query may include the customer's name, age, gender, telephone number, shopping and call history or any other record or information that identifies the customer. Accordingly, the user's identity may be resolved or determined using a unique ID value.

As shown by block 825, a user may be associated with a recorded interaction based on a unique ID value. For example, tracking interactions unit 410 may search database 450 for interaction recordings that are associated with screen recordings. For example, based on a time stamp, a naming convention or information in a database stored by an application that manages storage of recorded interactions and screen recordings, tracking interactions unit 410 may identify or determine that a specific recorded interaction is related or linked to a specific screen recording. It is noted that while a link or connection between a screen recording and a recorded interaction may be determined using known systems and methods, known systems and methods cannot determine or identify the user (or caller or customer) who participated in the interaction based on the link between the recorded interaction and the screen recording. As known in the art, many organizations keep masses of recorded interactions and screen recordings but are unable to associate these recordings with users, callers or customers. As described herein, embodiments of the invention enable associating historical or old recorded interactions and screen recordings with customers, users or callers.

For example, a first screen recording included in screen recordings 240 that is associated with a first recorded interaction included in recorded interactions 230 may be processed as described and a unique ID value that uniquely identifies the caller (or customer or user) in the interaction may be obtained as described. As described, the unique ID value may be used in order to obtain any information that identifies the caller (or customer or user) who participated in the interaction. For example, a name, home address, email address may be determined using the unique ID value as described. In order to associate the user (or customer or caller) with the first recorded interaction, the first recorded interaction may be associated with any information related to the user, e.g., an entry in a database that includes references to recorded interactions of a specific user may be updated to include a reference to the first recorded interaction. Associating a user with a recorded interaction may be done as known in the art, e.g., by referencing a name and path of a file that includes a recorded interaction in a record of a user in a database. In some embodiments, associating a user with a recorded interaction may be done, or achieved by pointers, linked lists or database objects and logic as known in the art. Generally, associating a user with a recorded interaction may include storing any information that enables finding a recorded interaction using information related to the user.

The advantages of associating historical interactions with specific users may be appreciated by those skilled in the art, for example, using past interactions to know what a customer requested or complained about in the past may enable an organization to better serve the customer. Therefore, embodiments of the invention solve the computer-centric challenge of using a corpus of recorded interactions by associating the interactions with users.

For example, output of a system and method according to some embodiments of the invention may be a list, table or other structure that enables obtaining screen recordings and/or recorded interactions related to a specific customer or client. For example, after association unit 215 determines that a specific recorded interaction included in recorded interactions 230 and/or that a specific recorded interactions are related to a specific customer, association unit 215 may associate the screen recording and recorded interaction with the customer (using an ID of the customer as described) and association unit 215 may update a database such that, provided with an identification of the customer, an agent or administrator may readily obtain recoded interactions in which the customer participated as well as possibly screen recordings made during calls or interactions in which the customer participated. Accordingly, the problem of storing masses of recorded interactions and/or screen recordings that cannot be related to, or associated with customers or callers can be solved by some embodiment of the invention since, as describe, some embodiments of the invention enable associating recorded interactions and/or screen recordings with callers or customers. Accordingly, the computer-centric problem of masses of redundant, or unusable, data (in the form of recorded interactions and/or screen recordings in which there is no way of telling who the participants are) is solved by embodiments of the invention as described.

A unique ID value and information in a database may be used to resolve, determine or identify a unique user identifier of a user. A unique user identifier may be used in order to associate a recorded interaction with the user. A unique user identifier may be any value, string or other digital information that uniquely identifies a user, e.g., an SSN. For example, a unique ID value as described herein may be a unique user identifier, however, a unique ID value may be used in order to obtain or determine a unique user identifier. For example, using the unique ID value of "54925", a unique user identifier of the user, e.g., a telephone number, SSN and the like may be determined or identified (e.g., using the unique ID value in a query to a database as described).

After a recorded interaction is associated with a user, other or additional recorded interactions may be associated with the user using a voice print that may be generated based on the recorded interaction. A voice print as known in the art may be a digital object or structure that includes information and/or logic usable for determining whether or not a voice of a specific user is included or captured in a recording. For example and as known in the art, a voice print may include characteristics of a user's voice that uniquely identify the user. Accordingly, provided with a voice print of a user generated based on a first recorded interaction, association unit 215 may examine recorded interactions 230 and find other, or additional recorded interactions in which the user is heard and association unit 215 may further associate the other or additional recorded interactions with the user, e.g., as described herein.

In some embodiments, associating users with recorded interactions and with screen recordings may be uniform or consistent with respect to the identification parameter used. For example, it may be desired to use an SSN as the identifier used for associating users with recorded interactions and screen recordings. For example, rather than associating a first recorded interaction with a first user using a telephone number (an identifier of a first type), and associating a second recorded interaction with a second user using an email address (an identifier of a second type), it may be desired to use a single or same type of identifier, e.g., use SSN's for all associations.

As described, to initially associate a user with an interaction, a value of any unique identifier, of any type, may be used. For example, any of: a customer ID, an SSN and a phone number may be used in order to associate a screen recording with a user as described. As described, once at least one unique identifier value is determined or obtained, additional or other identifiers of a user may be obtained, e.g., from a databases as described.

Accordingly, an embodiment may obtain or determine, for a first user, a value of a first unique user identifier of a first type, e.g., an SSN, and the embodiment may obtain or determine, for a second user, a value of a second unique user identifier of a second type, e.g., an email address. In some embodiments, the first and second unique user identifiers (of different types) may be used in order to respectively resolve the identities of the first and second users, e.g., as described, and an embodiment may determine and store, for the first and second users, a respective first and second unique ID values of the same type. For example, a customer ID value may be determined for a first user and first recorded interaction, an SSN value may be determined for a second user and a second recorded interaction and a value of a common or same type identifier, e.g., an email address may be determined for the first and second users and the common or same type identifier may be used to associate the users with interactions as described. Accordingly, an embodiment may enable or provide a simple interface, e.g., clients of a system and method according to some embodiments of the invention may use one type of identifier (e.g., an SSN) in order to receive, from a system or method, recorded interactions or screen recordings related to a user or customer.

As described herein, a unique ID value related to the user who participated in an interaction may be extracted and used in order to associate the user with a recorded interaction and/or with a screen recording. In some embodiments, other entities may be associated with a recorded interaction and/or with a screen recording. For example, using metadata (e.g., in screen metadata 270), an application that was used (e.g., by an agent in a contact center) during a call may be identified. For example, a header or other graphical element in a screen may be unique to a specific application, accordingly, the header may be included (or represented) in metadata 270 and association unit 215 may use information in metadata 270 in order to identify an application that was used by an agent during a call. For example, association unit 215 may identify all the interactions in recorded interactions 230 and/or in screen recordings 240 in which a specific application was used by an agent who participated in the interaction. For example, since association unit 215 may identify all interactions in which a specific application was used as described, association unit 215 may present (e.g., in a list) all interactions in which the application was used.

Some embodiments may associate an agent with interactions. For example, a method of associating an agent, representative or other personnel, with an interaction may include: obtaining a recording of an interaction with a user and a screen recording related to the interaction, e.g., as described herein. A unique ID value related to the agent or other personnel may be extracted from the screen recording, e.g., as described herein.

An identity of the agent may be resolved using the extracted unique ID value. For example, an agent's employee number extracted from a screen recording may be used in order to identify the agent (e.g., retrieve, from an organization's database, the agent's name, phone extension number etc.). The agent or other personnel may be associated with the recorded interaction based on the unique ID value. For example, since association unit 215 may identify all interactions in which a specific agent participated as described, association unit 215 may present (e.g., in a list) all interactions in which the agent participated.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of associating a user with an interaction, the method comprising:
    obtaining, by a processor, a stored past recording of an interaction and a stored past screen recording related to the interaction, wherein a stored past recording of an interaction is a recording of content of an interaction between an agent and a user and wherein the stored past screen recording is a recording of a graphical data presented by an application on a computer display of the agent;
    if the stored past recording of the interaction is not associated with the user then identifying, by the processer, the user by:
        identifying a predefined form displayed in the obtained past screen recording;
        identifying a location of one or more graphical elements in the predefined form; and
        extracting a unique identification value related to the user from the predefined form based on the location of the identified one or more graphical elements in the predefined form;
    assigning, by the processor, the identified user to the stored past recorded interaction; and
    assigning the stored past recorded interaction to the stored past screen recording.

2. The method of claim 1, comprising:
using the unique identification value and information in a database to resolve a unique user identifier of the identified user; and
using the unique user identifier to assign the recorded interaction to the identified user.

3. The method of claim 1, comprising:
creating a voice print based on the recorded interaction; and
using the voice print to associate additional recorded interactions with the identified user.

4. The method of claim 1, comprising using a graphical user interface (GUI) configuration tool to receive, from a user, an indication of a location of the unique identification value in a screen presented by an application.

5. The method of claim 1, comprising:
obtaining, for a first user, a first unique user identifier of a first type and obtaining, for a second user, a second unique user identifier of a second type;
using the first and second unique user identifiers to respectively resolve the identities of the first and second users; and
determining, for the first and second users, a respective first and second unique identification values, wherein the first and second unique identification values are of the same type.

6. The method of claim 1, comprising:
analyzing a frame in the screen recording;
determining whether or not the frame includes a predefined portion of a predefined screen; and
if the frame does not include the predefined portion of a predefined screen then processing an additional frame of the screen recording, and
if the frame includes the predefined portion of a predefined screen then extracting the unique identification value from the frame.

7. The method of claim 1, comprising:
extracting, from the screen recording, a unique identification value related to an agent;
resolving the identity of the agent using the extracted unique identification value; and
associating the agent with the recorded interaction based on the unique identification value.

8. The method of claim 1, comprising:
extracting, from the screen recording, a unique identification value related to an application; and
associating the application with the recorded interaction based on the unique identification value.

9. The method of claim 1, comprising:
resolving the identity of the user using the extracted unique identification value; and
using the identity to assign the identified user to the recorded interaction.

10. A system comprising:
a memory; and
a controller configured to:
obtain a stored past recording of an interaction and a stored past screen recording related to the interaction, wherein a stored past recording of an interaction is a recording of content of an interaction between an agent and a user and wherein the stored past screen recording is a recording of a graphical data presented by an application on a computer display of the agent;
if the stored past recording of the interaction is not associated with the user then identify the user by:
identifying a predefined form displayed in the obtained past recording;
identifying a location of one or more graphical elements in the predefined form; and
extracting a unique identification value related to the user from the predefined form based on the location of the identified one or more graphical elements in the predefined form;
assign the identified user to the stored past recorded interaction; and
assign the stored past recorded interaction to the stored past screen recording.

11. The system of claim 10, wherein the controller is configured to:
use the unique identification value and information in a database to resolve a unique user identifier of the user; and
use the unique user identifier to assign the recorded interaction to the identified user.

12. The system of claim 10, wherein the controller is configured to:
create a voice print based on the recorded interaction; and
use the voice print to associate additional recorded interactions with the user.

13. The system of claim 10, comprising a graphical user interface (GUI) configuration tool usable to receive, from a user, an indication of a location of the unique identification value in a screen presented by an application.

14. The system of claim 10, wherein the controller is configured to:
obtain, for a first user, a first unique user identifier of a first type and a obtain, for a second user, a second unique user identifier of a second type;
use the first and second unique user identifiers to respectively resolve the identities of the first and second users; and
determine, for the first and second users, a respective first and second unique identification values, wherein the first and second unique identification values are of the same type.

15. The system of claim 10, wherein the controller is configured to:
analyze a frame in the screen recording;
determine whether or not the frame includes a predefined portion of a predefined screen; and
if the frame does not include the predefined portion of a predefined screen then process an additional frame of the screen recording, and
if the frame includes the predefined portion of a predefined screen then extract the unique identification value from the frame.

16. The system of claim 10, wherein the controller is configured to:
extract, from the screen recording, a unique identification value related to an agent;
resolve the identity of the agent using the extracted unique identification value; and
associate the agent with the recorded interaction based on the unique identification value.

17. The system of claim 10, wherein the controller is configured to:
extract, from the screen recording, a unique identification value related to an application; and
associate the application with the recorded interaction based on the unique identification value.

18. The method of claim 1, wherein the predefined form comprises a plurality of graphical elements, each graphical element associated with a label and a value, wherein extracting a unique identification value from the predefined form comprises searching for a label and extracting a value from the element associated with the label.

19. The system of claim 10, wherein the predefined form comprises a plurality of graphical elements, each graphical element associated with a label and a value, wherein extracting a unique identification value from the predefined form comprises searching for a label and extracting a value from the element associated with the label.

20. The method of claim 1, wherein the predefined form is described by screen metadata, and extracting a unique identification value from the predefined form comprises referring to the screen metadata.

21. The system of claim 10, wherein the predefined form wherein the predefined form is described by screen metadata, and extracting a unique identification value from the predefined form comprises referring to the screen metadata.

22. The method of claim 1, wherein the predefined form is described by screen metadata, and extracting a unique identification value from the predefined form comprises using the screen metadata.

23. The system of claim 10, wherein the predefined form is described by screen metadata, and extracting a unique identification value from the predefined form comprises using the screen metadata.

24. The method of claim 1, wherein the predefined form is described by dimension data, and extracting a unique identification value from the predefined form comprises determining dimension data of the form when cropped from an image and determining dimensions of an element containing a unique identification value by comparing dimension data of the form when cropped from an image to the dimension data of the predefined form.

25. The system of claim 10, wherein the predefined form is described by dimension data, and extracting a unique identification value from the predefined form comprises determining dimension data of the form when cropped from an image and determining dimensions of an element containing a unique identification value by comparing dimension data of the form when cropped from an image to the dimension data of the predefined form.

* * * * *